(12) United States Patent
Shilling

(10) Patent No.: US 9,211,035 B2
(45) Date of Patent: Dec. 15, 2015

(54) FOOD PREPARATION APPARATUS AND METHOD

(76) Inventor: Thomas W. Shilling, Lakewood, CO (US)

( * ) Notice: Subject to any disclaimer, the term of this patent is extended or adjusted under 35 U.S.C. 154(b) by 994 days.

(21) Appl. No.: 13/359,724

(22) Filed: Jan. 27, 2012

(65) Prior Publication Data

US 2012/0196017 A1 Aug. 2, 2012

Related U.S. Application Data

(60) Provisional application No. 61/437,512, filed on Jan. 28, 2011.

(51) Int. Cl.
*A47J 37/04* (2006.01)
*A23L 1/01* (2006.01)

(52) U.S. Cl.
CPC . *A47J 37/049* (2013.01); *A23L 1/01* (2013.01)

(58) Field of Classification Search
CPC ....... A47J 37/048; A47J 37/049; A47J 37/06; A47J 37/044; A23L 1/01
USPC ..... 99/423, 441, 443 C, 443 R, 448; 426/523
See application file for complete search history.

(56) References Cited

U.S. PATENT DOCUMENTS

| | | | | |
|---|---|---|---|---|
| 3,298,303 A | * | 1/1967 | Waller | 99/423 |
| 3,472,156 A | * | 10/1969 | Bardeau | 99/423 |
| 4,516,485 A | * | 5/1985 | Miller | 99/339 |
| 4,633,772 A | | 1/1987 | Bowden et al. | |
| 5,117,748 A | | 6/1992 | Costa | |
| 6,201,218 B1 | | 3/2001 | Chandler et al. | |
| 6,257,126 B1 | | 7/2001 | Veljkovic et al. | |
| 6,279,462 B1 | | 8/2001 | Kim | |
| 6,289,793 B1 | | 9/2001 | Hu et al. | |
| 6,347,577 B1 | | 2/2002 | Harneit | |
| 6,360,652 B1 | | 3/2002 | Cusenza et al. | |
| 6,363,838 B1 | | 4/2002 | Tomatis | |
| 6,516,708 B2 | | 2/2003 | Cusenza et al. | |
| 6,530,307 B2 | | 3/2003 | Cusenza et al. | |
| 6,658,991 B2 | | 12/2003 | Backus et al. | |
| 6,927,366 B2 | | 8/2005 | Sawhney et al. | |
| 6,957,111 B2 | | 10/2005 | Zhu et al. | |
| 6,998,582 B1 | | 2/2006 | Maroti | |
| 7,001,637 B2 | | 2/2006 | Cusenza et al. | |
| 7,038,172 B1 | | 5/2006 | Stuck | |
| 7,081,603 B2 | | 7/2006 | Hoh et al. | |
| 7,104,667 B2 | | 9/2006 | Keller | |
| 7,117,866 B2 | | 10/2006 | Cantal | |
| 7,219,936 B1 | | 5/2007 | Willford | |
| 7,222,564 B2 | | 5/2007 | Sekiya | |
| 7,303,776 B2 | | 12/2007 | Sus et al. | |
| 7,367,261 B2 | * | 5/2008 | Gaskill et al. | 99/339 |
| 7,377,209 B2 | * | 5/2008 | Perttola | 99/343 |
| 7,520,211 B2 | | 4/2009 | Hunot et al. | |

(Continued)

*Primary Examiner* — Steven Leff
(74) *Attorney, Agent, or Firm* — Marsh Fischmann & Breyfogle LLP

(57) ABSTRACT

A cooking apparatus and method provide for relative movement between a first support member for food items and at least one stop member and/or relative movement between a first support member for food items and a second support member for food items. Relative lateral movement between a first support member and a stop member facilitates rolling movement of rollable food items. Relative up-and-down movement between first and second support members facilitates alternating support and attendant positioning of food items.

18 Claims, 6 Drawing Sheets

(56) References Cited

U.S. PATENT DOCUMENTS

| | | |
|---|---|---|
| 7,658,143 B2 | 2/2010 | Cretors |
| 8,828,468 B2 * | 9/2014 | Cretors ........................ 426/523 |
| 8,844,431 B2 * | 9/2014 | Davis et al. ..................... 99/441 |
| 8,869,683 B2 * | 10/2014 | Davis et al. ..................... 99/441 |

* cited by examiner

FOOD PREPARATION APPARATUS AND METHOD

RELATED APPLICATION

This application claims priority to U.S. Provisional Patent Application No. 61/437,512, filed Jan. 28, 2011, entitled "FOOD PREPARATION APPARATUS AND METHOD," which application is incorporated herein by reference in its entirety.

FIELD OF THE INVENTION

The present invention relates to apparatus and methods for the preparation of food items, and more particularly, to improved cooking apparatus and methods for rollable food items.

BACKGROUND OF THE INVENTION

A wide variety of cooking methodologies and associated apparatus have been developed for the preparation of food items, including in particular methodologies and apparatus for cooking. In this regard, cooking approaches provide for the heating of food items by one or more of heat conduction and/or convection and/or radiation.

Of particular interest here are cooking techniques that utilize one or more surfaces to directly contact and support food items relative to one or more heat source(s). By way of example, common grilling surfaces may comprise one or a plurality of stationary grate surfaces.

When heated to elevated temperatures, such grill surfaces are capable of burning food items in the regions of direct contact. Further, food items may also burn at locations other than the direct contact regions when left too long in a given position relative to the heat source.

As may be appreciated, burned portions of food items may have a bitter and otherwise undesirable taste. Further, such burned regions may contain carcinogens produced by the burning process. Additionally, grill surfaces may become coated with carbonized bitter residue that may adversely flavor food items cooked at a later time.

Of further note, known grilling approaches may yield items that are cooked in an uneven manner. For example, a bottom portion of a food item located upon a grill surface may be overcooked and possibly burned while a top portion of a food item spaced from the grill surface may be undercooked and possibly somewhat raw, thus posing a bacterial concern.

Attempts to address the above-noted cooking considerations typically entail a high degree of preparation attention and/or energy inefficiencies. For example, to avoid burning food items and/or uneven cooking of food items vigilant observation and repeated handling of the food item(s) may be entailed. Such handling may include repeated contact between cooking accessories (e.g., spatulas, tongs, forks, etc.) and the food item which may adversely affect the final taste and/or appearance of the food item. Further, repeated handling may expose the preparer of the food item to high temperatures and gaseous and particulate emissions due to the proximity of the food item and preparer to the heat source.

To avoid overcooking and/or otherwise facilitate observation of the cooking process, many food preparers may leave a cooking enclosure in an open condition. By way of a primary example, when utilizing barbecues with covers, many food preparers may leave the covers off or in a hinged-open position to avoid overly high temperatures and/or to otherwise facilitate visual inspection. As may be appreciated, such an approach results in energy inefficiencies and may adversely impact the predictability and promptness of food preparation timing. Further, such an approach may yield cooked food items having an undesirable "baked" taste as opposed to a more palatable "grilled" flavor.

SUMMARY OF THE INVENTION

A primary objective of the present invention is to provide methods and apparatus for cooking food items with enhanced evenness.

A further objective of the present invention is to facilitate the cooking of food items in a manner yielding reduced burning, or charring, of outer surfaces of the food items.

An additional objective in the present invention is to facilitate food cooking approaches that reduce the degree of attendant observation and direct food handling by food preparers.

Yet another objective of the present invention is to facilitate cooking techniques that result in reduced accumulation of undesired residue on cooking surfaces.

A further objective of the present invention is to provide improved food cooking approaches that yield corresponding attendant energy efficiencies.

One or more of the above-noted objective and additional advantages may be realized by cooking apparatus and methodologies provided herein. In this regard, the present inventor has recognized that the preparation of "rollable" food items may be enhanced by providing arrangements that may roll such items on one or more support surfaces during at least a portion of a cooking process. For purposes hereof, rollable food items may include items having a shape, or configuration, that lends itself to being rolled on an outer surface of the item. By way of example, rollable food items may include, but are not limited to items having generally arcuate surfaces. As may be appreciated, the invention is particularly apt for use in cooking generally cylindrically-shaped items such as hot dogs, bratwurst, ears of sweet corn and other similarly shaped items.

In one embodiment, a cooking apparatus may include a first support member disposed to support a rollable food item relative to a heat source, and at least one stop member, wherein the first support member is laterally moveable, or advanceable, in a first lateral direction relative to the stop member(s). The stop member(s) may be disposed to restrain lateral movement of a rollable food item supported by the first support member when the first support member is moved in the first lateral direction. In turn, the apparatus is operable to roll the rollable food item relative to a heat source (e.g., a radiant heat source).

As may be appreciated, such functionality may facilitate even cooking of rollable food items. Further, such functionality may reduce overcooking (e.g., burning of food items). In turn, attendant maintenance of the improved cooking apparatus may be reduced. Additionally, reduced food handling and enhanced energy efficiency may be realized in conjunction with use of the cooking apparatus.

In some embodiments, the first support member may be laterally moveable, or retractable, in a second lateral direction opposite to the first lateral direction. As may be appreciated, the first support member may alternately move in the first lateral direction and second lateral direction in conjunction with operation of the cooking apparatus.

In certain implementations, the cooking apparatus may further include a second support member that is disposed relative to the first support member to support a rollable food item relative to the heat source, free from relative movement with respect to the rollable food item, when the first support member is moved, or retracted, in the second lateral direction. In conjunction with such arrangements, the first support member may also be raisable and lowerable relative to the second support member, wherein the first upper surface of the first support member may be disposed above a second upper surface of the second support member during at least a portion of lateral movement attendant to advancement of the first support member in the first lateral direction. Further, the first upper surface of the first support member may be disposable below the second upper surface of the second support member during at least a portion of lateral movement attendant to retractive of the first support member in the second lateral direction.

As may be appreciated, the first support member may be moveable in the first lateral direction and second lateral direction, and raisable and lowerable along a predetermined path. Such predetermined path may be of a closed-loop, polygonal configuration. In one approach, the predetermined path may approximate a trapezoidal configuration.

The cooking apparatus may include a rotatable drive member, and a first cam interconnected to the drive member, wherein the first cam is operable to effect lateral movement of the first support member in a first direction in response to rotation of the rotatable drive member in a first rotational direction. Further, the first cam may be operable to effect lateral movement of the first support member in a second lateral direction (e.g., opposite to the first lateral direction) in response to rotation of the drive member in the first rotational direction. In various arrangements the first cam may be a rotary cam having a lobed configuration.

In some embodiments, the cooking apparatus may include a second cam interconnected to a rotatable drive member, wherein the second cam is operable to raise and lower the first support member in response to rotation of the drive member in a first rotational direction. In various arrangements, the second cam may be a rotary cam having a lobed configuration.

In some implementations the stop member(s) may be provided so that at least a portion thereof extends away from a top surface of the first support member and/or second support member at an acute angle in a direction corresponding with the direction of advancement of the first support member noted above. In turn, the stop member(s) may function as a ramp to induce rolling movement of a rollable food item. Further in this regard, the angled stop member(s) may be provided so that a rollable food item may engage the stop member(s) and roll down the stop member(s) in arrangements in which the first support member is lowerable relative to a second support member.

As may be appreciated, the present invention is further directed to an inventive method for use in cooking rollable food items. The method may include the steps of supporting a rollable food item on a first support member relative to a heat source, and advancing the first support member in a first lateral direction relative to the heat source during a portion of the supporting step. The method may further include the step of restraining, by at least one stop member, the movement of the rollable food item in the first lateral direction during at least a portion of the moving step, wherein the rollable food item rolls relative to the first support member.

The method may further include the step of retracting the first support member in a second lateral direction relative to the heat source, such second lateral direction being substantially opposite to the first lateral direction. In turn, the method may include supporting the rollable food item on a second support member, free from movement of the rollable food item, during at least a portion of the retracting step.

In some implementations, the method may further include the step of raising the first support member relative to the second support member, wherein an upper surface of the first support member is disposable above an upper support surface of the second support member. In turn, the method may also include a step of lowering the first support member relative to the second support member, wherein the upper surface of the first support member is disposable below the upper surface of the second support member.

In various applications, at least a portion of the raising step may be completed prior to the advancing step. Further, at least a portion of the lowering step may be completed prior to the retracting step.

The method may further include the steps of rotating a drive member in a first rotational direction about a center axis, and moving a first rotary cam about the center axis in response to the rotating step to effect the advancing and the retracting steps. Further, the method may provide for moving a second rotary cam about the center axis in response to the rotating step to effect the raising and lowering steps noted above.

Numerous additional features and advantages of the present invention will become apparent to those skilled in the art upon consideration of the embodiment descriptions provided hereinbelow.

DETAILED DESCRIPTION

Figure 1:
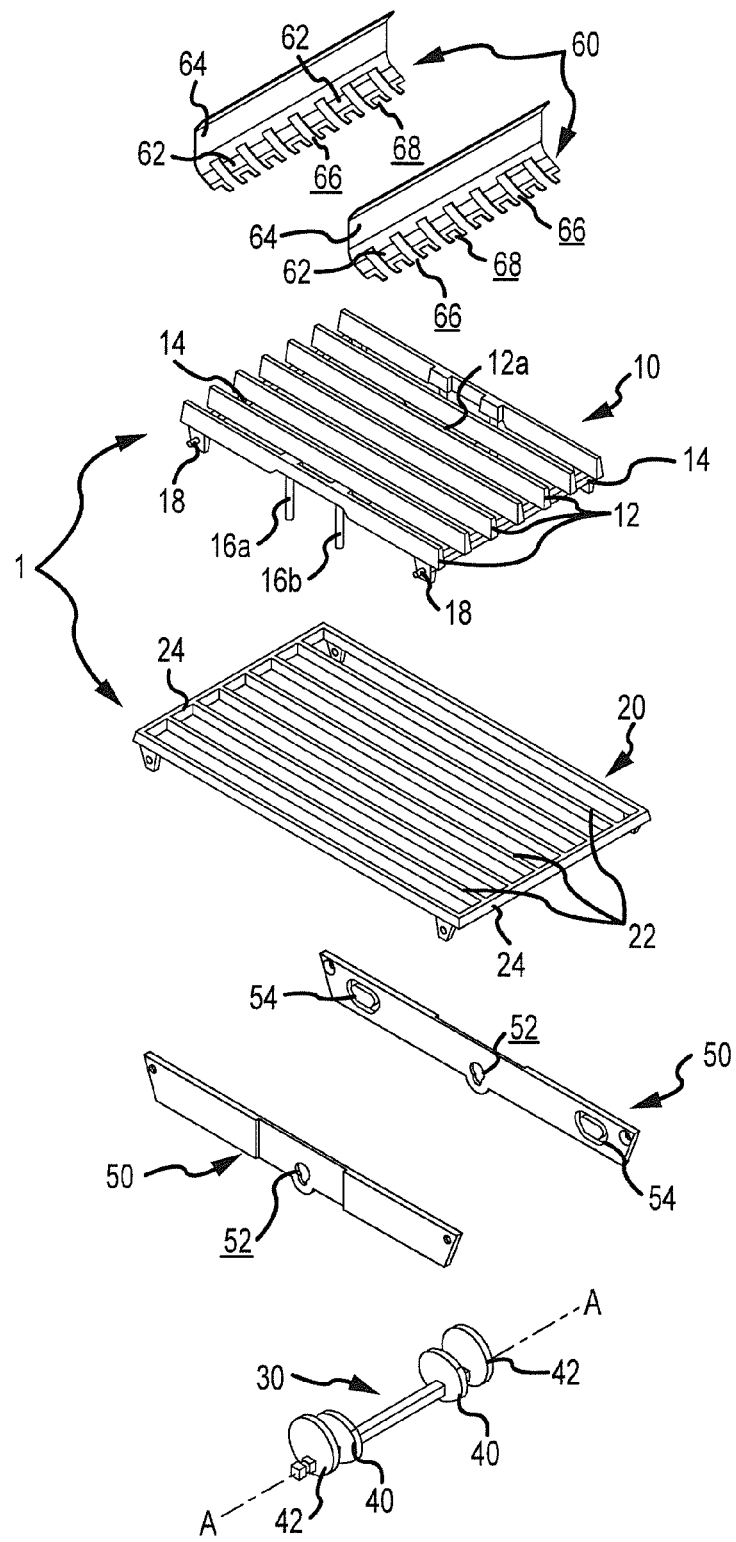
FIG. 1 is an exploded assembly view of one embodiment of an improved cooking apparatus.

FIG. 1 illustrates one embodiment of a cooking apparatus 1. The cooking apparatus 1 may be implemented in a variety of applications. By way of example, the cooking apparatus 1 may be utilized with a variety of different types of heat sources, including for example heat sources such as gas (e.g., propane or natural gas), charcoal, wood, electric, infrared radiant and inductive. Such heat source(s) may be typically located below and/or above the cooking apparatus 1.

Optionally, the cooking apparatus 1 may be located within an openable/closeable enclosure, including for example hinged, box-like enclosures, kettles, barrels, as well as ovens, fire pits, fire boxes, stoves; all either stationary or portable.

As illustrated in FIG. 1, the cooking apparatus 1 may include a first support member 10, a second support member 20, a drive member 30, cam members 40, 42, guide members 50 and one or more restraint member(s) 60. The first support member 10 may be of grill-like configuration that includes a plurality of grate members 12 disposed in spaced and aligned relation by lateral members 14 interconnected to the grate members 12 at opposing ends thereof. In this regard, the first support member 10 may be configured for movement and handling as unitary structure.

The second support member 20 may also be of a grill-like configuration that includes a plurality of grate members 22 disposed in spaced and aligned relation by lateral members 24 interconnected to the grate members 22 at opposing ends thereof. In this regard, the second support member 20 may be configured for movement and handling as unitary structure.

As it will be further described, the first support member 10 and second support member 20 may be provided to facilitate relative movement therebetween. For example, the first support member 10 and second support member 20 may be provided so that grate members 12 and grate members 22 are disposed in offset relation to facilitate relative lateral movement therebetween and/or relative up-and-down movement therebetween. In various implementations, the first support member 10 may be provided for selective relative movement relative to the second support member 20, wherein different ones of grate members 12 may laterally advance and retract and/or pass up-and-down between different pairs of grate members 22.

To facilitate relative movement of the first support member 10 and second support member 20 the drive member 30 may operatively engage cam members 40, 42. In this illustrated embodiment, two pairs of cam members 40, 42 are shown. Each of the cam members 40, 42 may operatively engage the first support member 10. In some embodiments cam members 40, 42 may be rotating cams. In this regard, rotation of drive member 30 (e.g., about axis AA) may co-rotate cam members 40 to affect up-and-down movement of first support member 10 relative to second support member 20, and rotation of drive member 30 may co-rotate cam members 42 to affect lateral movement of first support member 10 relative to second support member 20. In some implementations, such relative movement may be facilitated by a non-uniform, peripheral configuration of cam members 40 (e.g., a lobed-cam configuration), and by a non-uniform, a peripheral configuration of cam member 42 (e.g., a lobed-cam configuration).

For example, each cam member 40 may be of a common configuration and disposed to supportably engage at least a portion of the first support member 10, e.g., a bottom surface portion 12a of one of the grate members 12, wherein rotation of drive member 30 and associated co-rotation of cam members 40 causes a peripheral edge of each cam member 40 to supportably engage, and thereby raise and lower first support member 10 relative to second support member 20.

Correspondingly, each cam member 42 may be of a common configuration and disposed to laterally engage a pair of posts 16a, 16b which extend away from support member 10 (e.g., extending downward from one of the grate members 12), wherein rotation of drive member 30 and associated co-rotation of each cam member 42 causes a peripheral edge of each cam member 42 to laterally and alternately engage corresponding posts 16a, 16b, and thereby laterally advance (e.g., move in a first lateral direction) and retract (e.g., move in an opposite, second lateral direction) first support member 10 relative to second support member 20. As may be appreciated, the cam members 40, 42 may be provided so that the first support member 10 is moveable along a path in correspondence to rotation of drive member 30 and the resultant combination of movement induced by the cams 40, 42 being rotated.

As shown in FIG. 1, two pairs of cam members 40, 42 may be provided adjacent to opposing ends of drive member 30 for engagement with corresponding bottom surface portions 12a and corresponding post pairs 16a, 16b. The utilization of two pairs of cam members 40, 42, yields balanced force delivery by drive member 30 to first support member 10.

To further facilitate the noted relative movement of first support member 10 and second support member 20, the guide members 50 may be located adjacent to opposing sides of the first support member 10. In turn, guide members 50 may each include an aperture 52 for receipt of opposing ends of drive member 30 therewithin. In this regard, drive member 30 may rotate relative to the apertures 52 of guide members 50. Further, to facilitate repeatable and consistent movement of the first support member 10 in response to rotation of drive member 30, each guide member 50 may include guide tracks 54 located at opposing ends thereof for receipt of corresponding guide pins 18 extending away from the sides of first support member 10 adjacent to opposing ends thereof. As may be appreciated, the configuration of guide tracks 54 may coincide with the path followed by first support member 10.

As illustrated in FIG. 1, restraint member(s) 60 may include a body of portion 64 and an interconnected plurality of stop members 62 disposed across first support member 10 and second support member 20. Such positioning locates the body portion 64 and stop members 62 transverse to the direction of lateral movement (e.g., advancement and retraction) of first support member 10. In turn, stop members 62 and potentially body portion 64 may engage and restrain lateral movement of a rollable food item located on the first support member 10, wherein the rollable food item may roll in response to such restraint.

In one approach, the restraint member(s) 60 may include a plurality of stop members 62 that extend away from the body portion 64 with slots 66 provided between adjacent ones of the plurality of stop members 62. At least some of the stop members 62 may include a notch 68 for receipt of different ones of the grate members 22 of the second support member 20. In this regard, the notches 68 of stop members 62 may be slightly tapered inward to facilitate selective receipt of, fixed-positioning relative to, and removal from grate members 22 of the second support member 20.

The slots 66 of the restraint member(s) 60 may be provided to receive and accommodate relative movement of grate members 12 therewithin. Specifically, grate members 12 may pass upward/downward and may laterally advance/retract through slots 66 during at least a portion of their travel along the above-referenced closed path in response to rotation of drive member 30.

The restraint member(s) 60 may be provided so that the stop members 62 extend away from the grate members 22 at an acute angle in a direction corresponding with the first lateral direction of advancement of grate members 12 effected by cam member(s) 42. In turn, stop members 62 function as a ramp to induce rotation of a rollable food item. That is, a rollable food item may be supported by and roll upon the stop members 62 wherein grate members 12 are lowered relative to grate members 22.

In another approach, stop members may be provided in the form of one or more elongated rod member that may be interconnected to and extend away from one or more of the grate members 22. For example, rod members may be selectively inserted into corresponding apertures provided on the top surfaces of grate members 22 in a spaced and aligned manner across apparatus 1. Such rod members may be angled to function as ramps to effect rolling movement of a food item thereupon.

Reference is now made to FIGS. 2-6 which illustrate cooking apparatus 1 with first support member 10 and second support member 20 disposed in different relative positions in response to rotation of drive member 30. In this regard, portions of grate members 22, grate members 12 and one of the restraint members 60 are cut-away in FIGS. 2-6 to facilitate discussion of the operation of cam members 40, 42.

In contemplated applications, food items may be located on cooking apparatus 1 to the right of either of the restraint members 60. For example, rollable food items (e.g., generally cylindrical items such as hot dogs, ears of sweet corn etc.), may be positioned transversely across cooking apparatus 1, wherein longitudinal axes of the food items are generally parallel with the outer axis AA of drive member 30.

As will be described, food items may be alternately supported by first support member 10 and second support member 20, wherein rollable food items may be rolled, or rotated, during at least a portion of the time they are supported by first support member 10 (e.g., when engaged with a restraint member 60).

Figure 2:
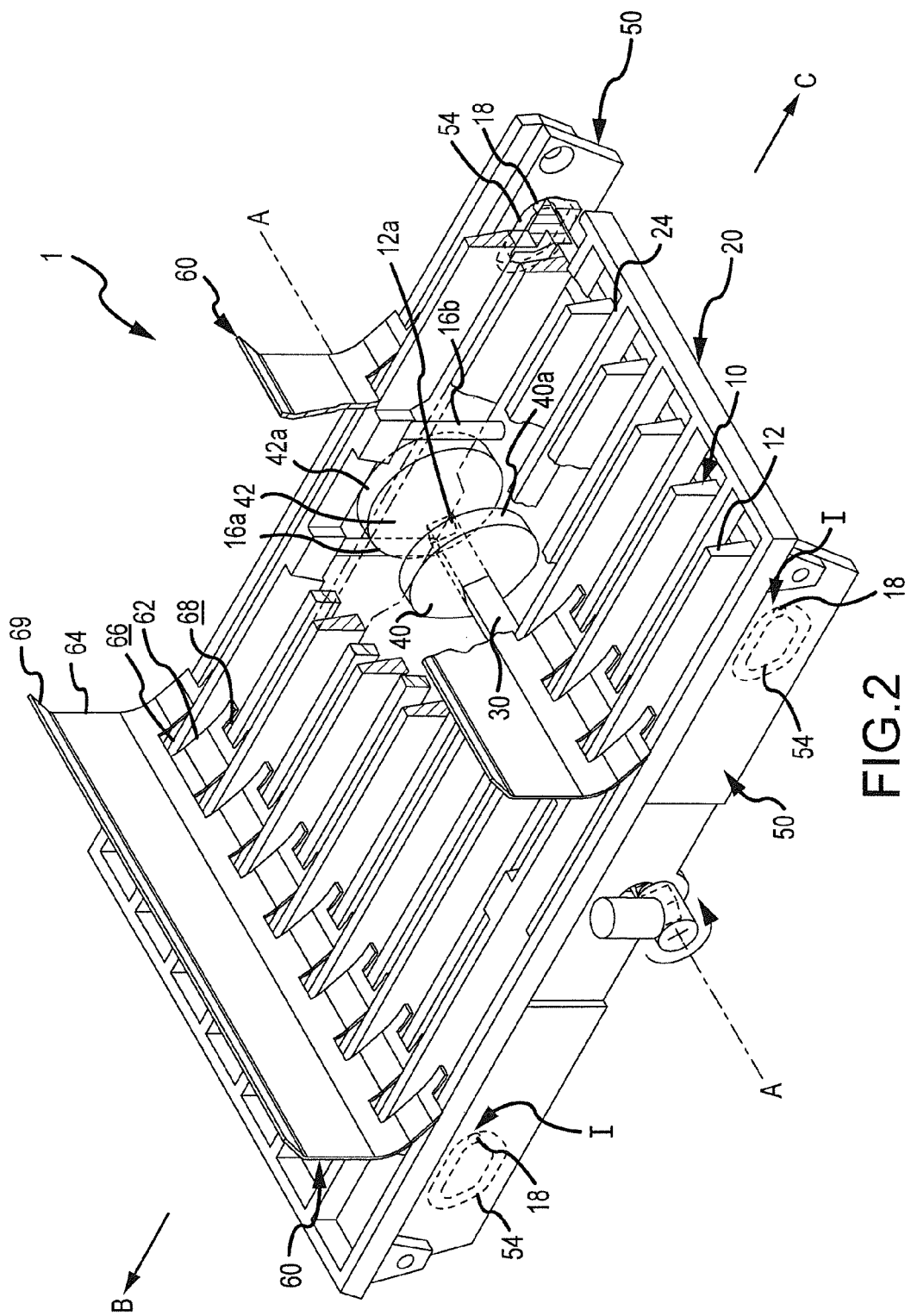
FIGS. 2-6 are perspective, partial cut-away views of the embodiment of FIG. 1, shown with first and second support members thereof in different relative positions.

FIG. 2 illustrates first support member 10 in a raised position relative to second support member 20. Such raised position is realized pursuant to supportive engagement between peripheral edge 40a of the cam member 40 with a bottom surface portion 12a, shown in phantom, of a grate member 12 of the first support member 10. In the illustrated embodiment, the bottom surface portion 12a protrudes downward. As shown, the portion of peripheral edge 40a of cam member 40 engaging bottom surface portion 12a of grate member 12 is disposed at a distance from center axis AA of drive member 30 so as to locate the top surfaces of grate members 12 in an elevated position relative to top surfaces of grate members 22. In turn, food items located on cooking apparatus 1 may be supported by grate members 12 in a raised position relative to a heat source located below first support member 10 and second support member 20.

With further reference to FIG. 2, cam member 42 is located so that a peripheral edge 42a is in engaged with post 16a, shown partially in phantom. In this position, the first support member 10 is located for advancement by cam members 42 in a first lateral direction B relative to second support member 20.

In this regard, pins 18 of first support member 10 are shown disposed in an elevated/retracted position I within guide tracks 54 of guide member 50. As may be appreciated, pins 18 may travel along guide tracks 54 in a closed loop fashion in response to the rotation of guide member 30. In the illustrated embodiment, the guide tracks 54 are of a trapezoidal configuration.

Figure 3:
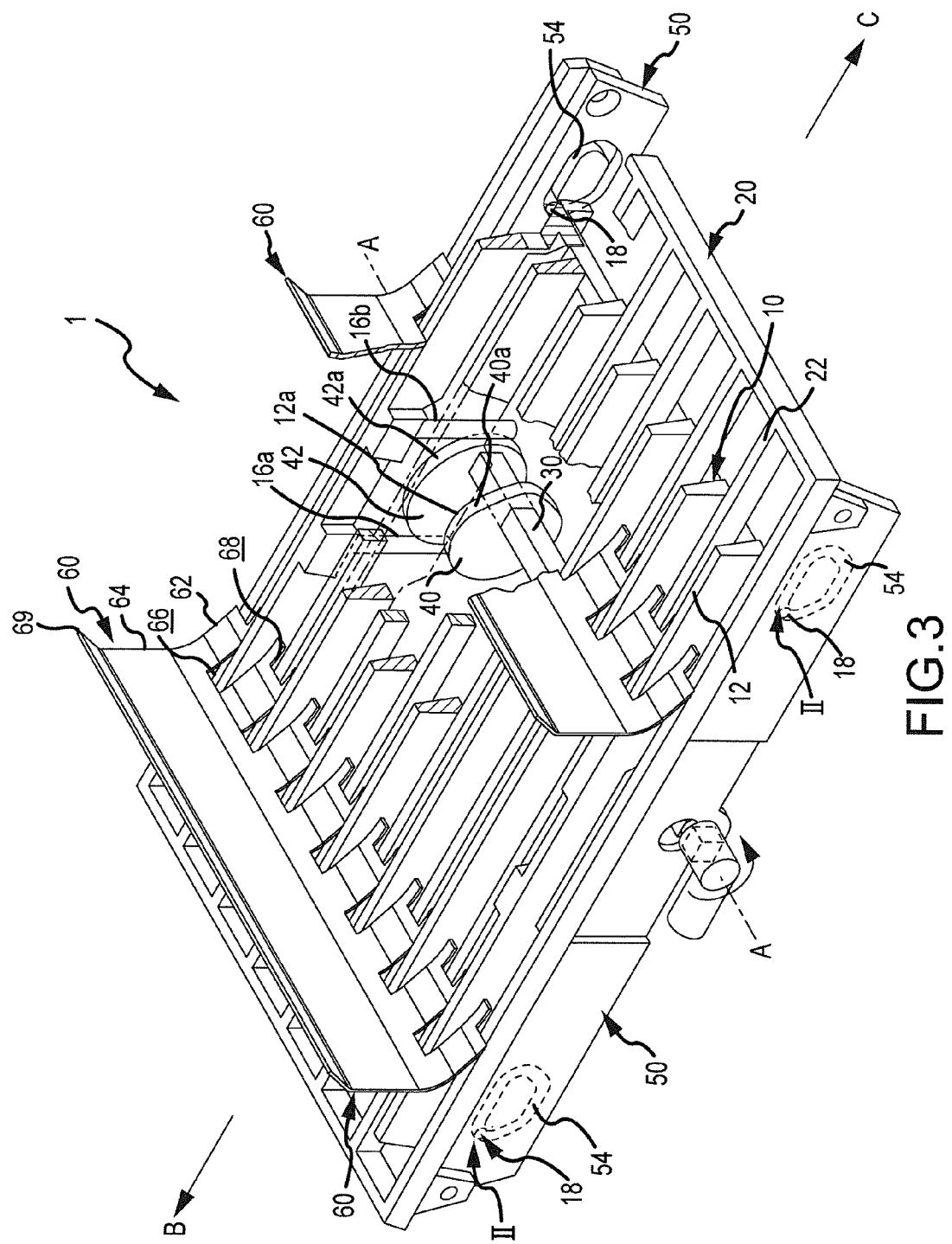

Reference is now made to FIG. 3 which illustrates first support member 10 having advanced in the first lateral direction B relative to second support member 20, and relative to the position shown in FIG. 2, in response to rotation of drive member 30. In this regard, a distance between center axis AA of drive member 30 and a location of engagement between the peripheral edge 42a and post 16a is increased relative to the corresponding distance shown in FIG. 2. Such increase in distance is a function of the peripheral configuration of cam member 42 and location of interconnection with drive member 30. For example, when a rotary cam member 42 is employed, e.g., a lobed, rotary cam member, rotation of drive member 30 causes cam member 42 to engage post 16a and thereby move first support member 10 in the first lateral direction B.

In conjunction with such movement, the bottom surface portion 12a of grate member 12 advances in the first lateral direction B and the peripheral surface 40a of cam member 40 rotates about center axis AA of the drive member 30. Cam member 40 is configured and interconnected to drive member 30 so that the outer periphery 40a engages bottom surface portion 12a to maintain the top surfaces of grate members 12 above the top surfaces of grate members 22 as first support member 10 advances from the position shown in FIG. 2 to the position shown in FIG. 3. In further conjunction with such movement, pin members 18 of first support member 10 have advance in direction B within guide tracks 54 to an advanced/elevated position II. As may be appreciated, the length of guide track 54 between positions I and II may correspond with the travel distance of first support member 10 relative to second support member 20 in the first direction B.

As first support member is advanced relative to the second support member 20 from the position shown in FIG. 2 to the position shown in FIG. 3 a food item supported by the top surfaces of grate members 12 may engage a restraint member 60, thereby restraining lateral movement in direction B. In turn, rollable food items may roll in a direction corresponding with direction C. To facilitate such rolling movement, retention members 60 may be configured so that stop members 62 angle away from grate members 12 in direction B. In this regard, the rolling movement may occur during and after grate members 12 have advanced a food item into engagement with a retention member 60 so angled. For example, when a rollable food item engages a retention member 60, and grate members 12 are lowered, the rollable food item may be supported by and roll down the stop members 62 in direction C. Further, a top edge 69 of retention members 60 may be configured to angle in direction C, thereby restraining food items from movement over retention members 60.

Figure 4:
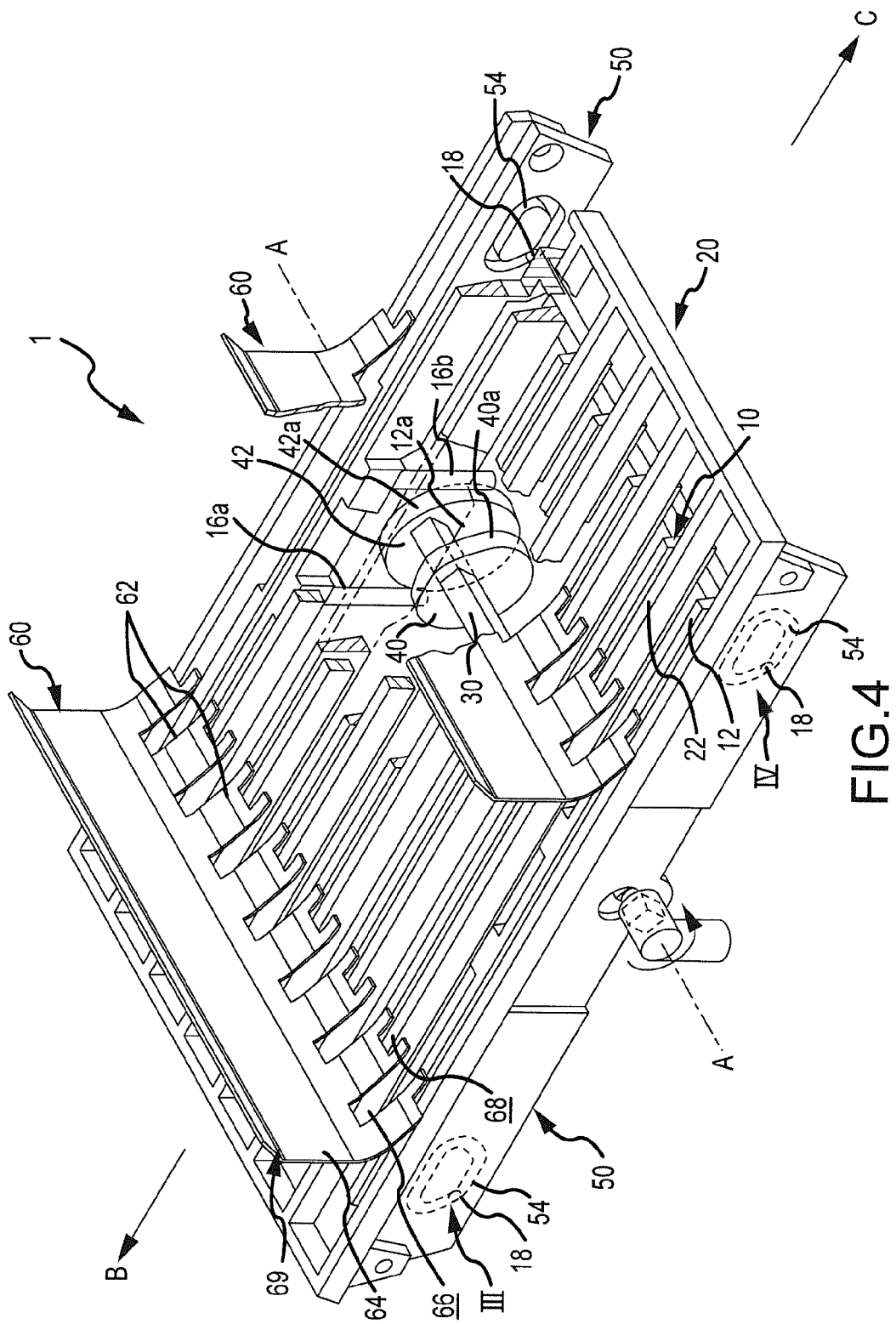

Reference is now made to FIG. 4, which illustrates first support member 10 lowered relative to the second support member 20, and relative to the position shown in FIG. 3, in response to further rotation of drive member 30. In this regard, the distance between the center axis AA of drive member 30 and a location of engagement between the peripheral edge 40a with bottom surface portion 12a of grate 12 is decreased relative to the corresponding distance shown in FIG. 3. Such decrease in distance is a function of the peripheral configuration of cam member 40 and interconnection with drive member 30. For example, when a rotary cam member 40 is employed, e.g., a lobed rotary cam member, rotation of drive member 30 causes cam member 40 to engage and thereby lower the bottom surface portion 12a and thereby lower first support member 10.

In the position shown in FIG. 4, the top surfaces of grate members 12 are positioned below the top surfaces of grate members 22. In turn, food items located on cooking apparatus 1 may be supported by grate members 22 in a relatively stationary position relative to a heat source located below for support member 10 and second support member 20.

With further reference to FIG. 4, cam member 42 is located so that peripheral edge 42a is engaged with post 16b. In this position, the first support member 10 is located for retraction by cam member 42 in the second lateral direction C relative to second support member 20. In this regard, pins 18 of the first support member 10 are shown in a lowered/advanced position III within guide tracks 54 of guide members 50.

Figure 5:
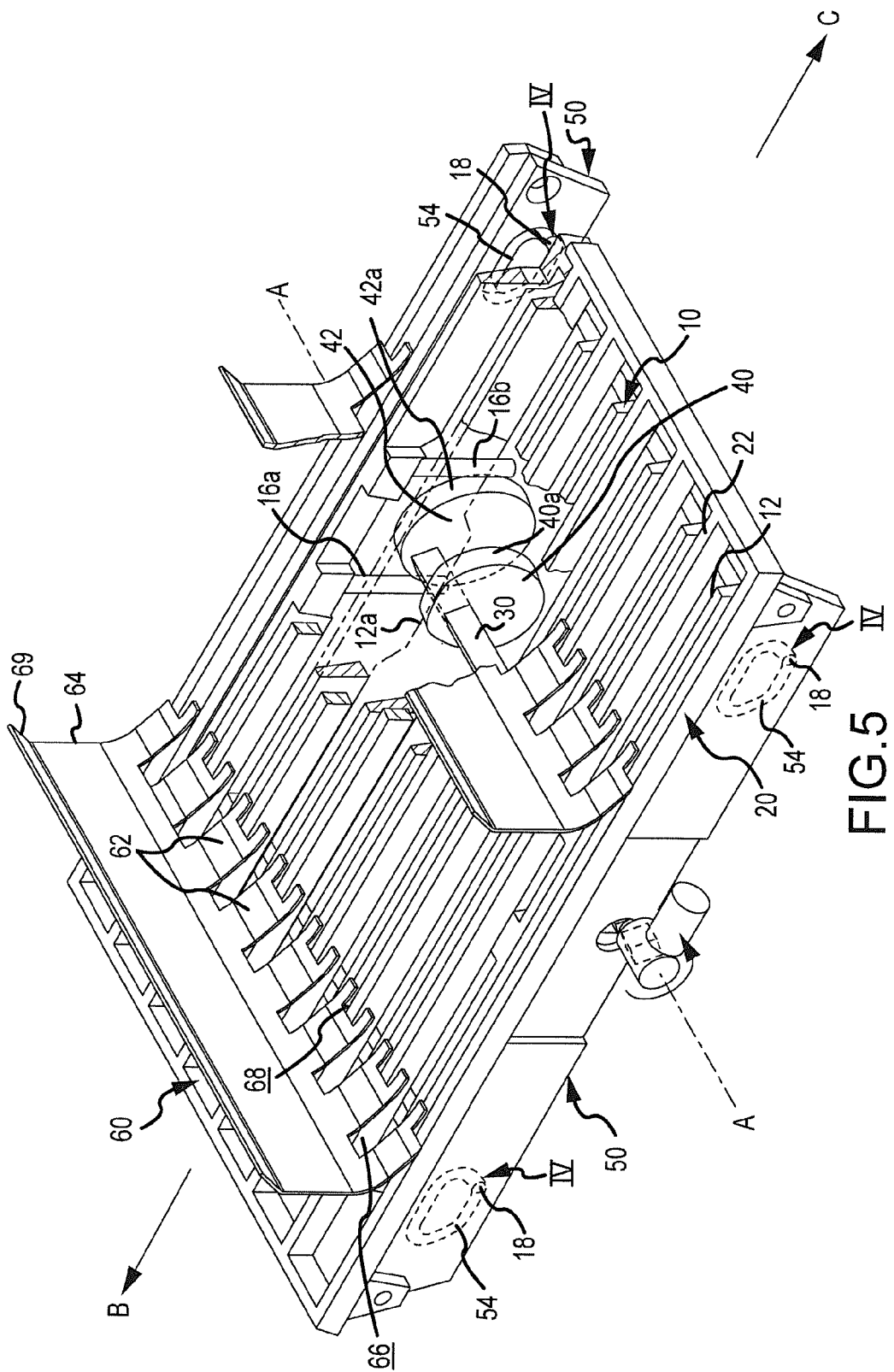

Reference is now made to FIG. 5 which illustrates first support member 10 having retracted in the second lateral direction C relative to second support member 20, and relative to the position shown in FIG. 4, in response to further rotation of drive member 30. In this regard, the distance between the center axis AA of drive member 30 and a location of engagement between the peripheral edge 42a with post 16b is increased relative to the corresponding distance shown in FIG. 4. Such increase in distance is a function of the peripheral configuration of cam member 42 and interconnection with drive member 30. Again, far example, when a rotary cam member 42 is employed, e.g., a lobed, rotary cam member, rotation of drive member 30 causes cam member 42 to engage post 16b and thereby move first support member 10 in the second lateral direction C.

In conjunction with such movement, the bottom surface portion 12a of grate member 12 advances in the second lateral direction C and the peripheral surface 40a of cam member 40 rotates in direction C about center axis AA of the drive member 30. Cam member 40 may be configured and interconnected to drive member 30 so that the outer periphery 40a engages bottom surface portion 12a to maintain the top surfaces of grate members 12 below the top surfaces of grate members 22 as the first support member 10 retracts from the position shown in FIG. 4 to the position shown in FIG. 5. In conjunction with such movement, pin members 18 of first support member 10 may advance in direction C within guide tracks 54 to a retracted/lowered position IV.

Figure 6:
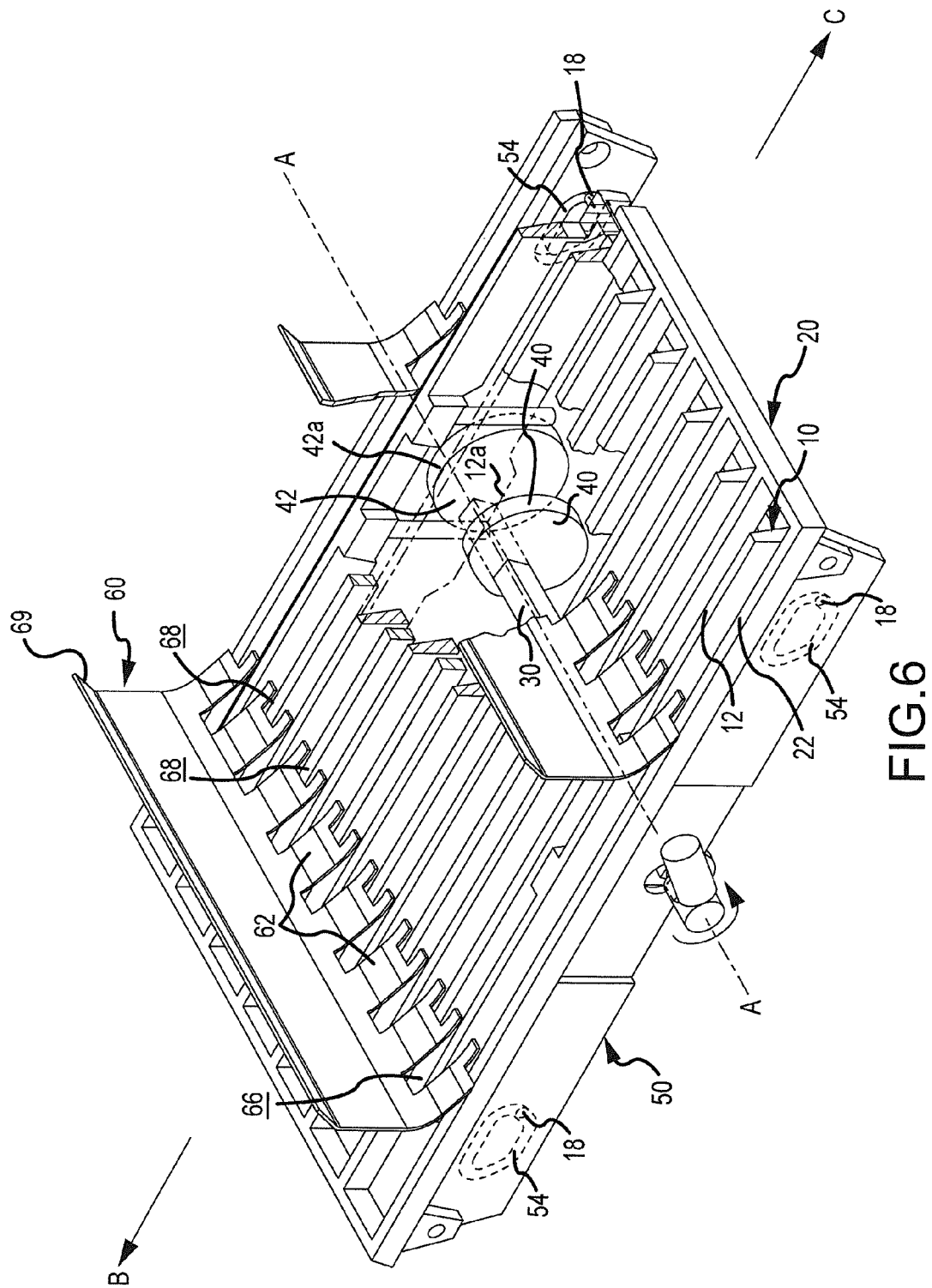

As shown in FIG. 6, upon further rotation of drive member 30, first support member 10 may be raised to reassume the position shown and described above in relation to FIG. 2. The sequence shown in FIGS. 2-6 may be repeated and selectively controlled via simple rotative control of drive member 30.

The cooking apparatus embodiment 1 described above may be supported relative to a heat source in any appropriate manner. For example, cooking apparatus 1 may be located within an openable/closeable enclosure, e.g., via interconnection of guide members 50 and/or second support member 20 to the enclosure or other support structure. Further, drive member 30 may be provided with a handle mechanism to facilitate manual and/or automated rotation.

Further in this regard, drive member 30 may be provided so that rotational movement thereof is imparted by a second rotatable drive member that extends in direction B or C and interfaces with drive member 30 via a mechanism that translates rotational movement between an axis of the second drive member and axis AA of drive member 30. By way of example, a worm gear interface may be employed between a second drive member and drive member 30. Such an arrangement may be particularly apt for use in adapting existing barbeques having automated rotisserie side motor mounts for use with the present invention. By way of example, an output shaft of a rotisserie motor may be adapted to interface with a second drive member that interfaces via a translation mechanism with drive member 30 of the cooking apparatus embodiment 1 described hereinabove.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A cooking apparatus for use with a heat source to cook food items comprising:
   a first support member disposed to support a food item relative to a heat source;
   at least one stop member, said first support member being laterally moveable in a first lateral direction relative to said at least one stop member and said first support member being laterally moveable in a second lateral direction opposite to said first lateral direction, and said at least one stop member being disposed to restrain lateral movement of a food item supported by the first support member when the first support member is moved in the first lateral direction, wherein the apparatus is operable to roll a food item having a configuration that is rollable, relative to a heat source;
   a second support member disposed relative to the first support member to support a food item relative to a heat source, free from relative movement with respect to a food item, when the first support member is moved in the second lateral direction; and
   wherein said first support member is raisable and lowerable relative to said second support member, wherein a first upper surface of said first support member is disposable above a second upper surface of said second support member during at least a portion of lateral movement when said first support member is moved said first lateral direction, and wherein said first upper surface of said first support member is disposable below said second upper surface of member is moved in said second lateral direction.

2. The cooking apparatus of claim 1, wherein said first support member is moveable in said first lateral direction and said second lateral direction, and raisable and lowerable, along a predetermined path.

3. The cooking apparatus of claim 2, further comprising:
   a rotatable drive member; and,
   a first cam interconnected to said drive member, wherein said first cam is operable to effect lateral movement of said first support member in said first lateral direction in response to rotation of said drive member in a first rotational direction.

4. The cooking apparatus of claim 3, wherein said first cam is operable to effect lateral movement of said first support member in said second lateral direction in response to rotation of said drive member in said first rotational direction.

5. The cooking apparatus of claim 4, further comprising:
   a second cam interconnected to said drive member, wherein said second cam is operable to raise and lower said first support member in response to rotation of said drive member in said first rotational direction.

6. The cooking apparatus of claim 5, wherein said drive member and said first cam and said second cam are supportably interconnected to said second support member.

7. The cooking apparatus of claim 2, further comprising:
   at least one camway slot fixedly positioned relative to said second support member, wherein said first support member comprises at least one follower member that passes along said camway slot in conjunction with movement of said first support member along said predetermined path.

8. The cooking apparatus of claim 2, further comprising:
   a plurality of camway slots fixedly positioned relative to said second support member, wherein said first support member comprises a plurality of follower members that pass along corresponding different ones of said plurality of camway slots in conjunction with movement of said first support member along said predetermined path.

9. The cooking apparatus of claim 1, wherein said at least one stop member is fixedly interconnected to and projects away from said second support member.

10. The cooking apparatus of claim 1, further comprising:
    a plurality of stop members fixedly interconnected to and projecting away from said second support member.

11. The cooking apparatus of claim 1, further comprising:
    a first plurality of stop members disposed to restrain lateral movement of a food item supported by the first support member when the support member is moved in the first lateral direction, wherein said plurality of stop members are offset from each other in a direction transverse to said first lateral direction.

12. The cooking apparatus of claim 11, wherein each of said plurality of stop members are fixedly interconnected to and project away from said second support member.

13. The cooking apparatus of claim 11, wherein each of said first plurality of stop members angle away from said second support member in a direction coinciding with said first lateral direction so as to engage and thereby induce rotation of a food item having a configuration that is rollable.

14. The cooking apparatus of claim 11, further comprising: a second plurality of stop members interconnected to said second support member and spaced laterally from said first plurality of stop members, wherein a food item is retainable between said first plurality of stop members and said second plurality of stop members.

15. The cooking apparatus of claim 11, wherein said first support member and said second support member comprise a first plurality of grate elements and second plurality of grate elements, respectively, wherein different ones of said first plurality of grate elements are disposed for movement between different ones of said second plurality of grate elements.

16. The cooking apparatus of claim 15, wherein different ones of said first plurality of stop members are interconnected to and project away from different ones of said second plurality of grate elements.

17. The cooking apparatus of claim 16, wherein said first support member is raisable and lowerable relative to said second support member, wherein a first upper surface of said first support member is disposable above a second upper surface of said second support member during at least a portion of lateral movement when said first support member is moved said first lateral direction, and wherein said first upper surface of said first support member is disposable below said second upper surface of said second support member during at least a portion of lateral movement when said first support member is moved in said second lateral direction.

18. The cooking apparatus of claim 17, wherein said first support member is moveable in said first lateral direction and said second lateral direction, and raisable and lowerable, along a predetermined path.

* * * * *

UNITED STATES PATENT AND TRADEMARK OFFICE
CERTIFICATE OF CORRECTION

| | | |
|---|---|---|
| PATENT NO. | : 9,211,035 B2 | Page 1 of 1 |
| APPLICATION NO. | : 13/359724 | |
| DATED | : December 15, 2015 | |
| INVENTOR(S) | : Thomas W. Shilling | |

It is certified that error appears in the above-identified patent and that said Letters Patent is hereby corrected as shown below:

In the specification,

Column 8, Line 53, delete "far" and insert therefor -- for --;

In the claims,

Claim 1, Column 10, Line 9, after "of", insert -- said second support member during at least a portion of lateral movement when said first support --.

Signed and Sealed this
Fifth Day of April, 2016

Michelle K. Lee
*Director of the United States Patent and Trademark Office*